(12) United States Patent
Park et al.

(10) Patent No.: US 11,095,145 B2
(45) Date of Patent: Aug. 17, 2021

(54) REFRIGERATOR

(71) Applicant: LG ELECTRONICS INC., Seoul (KR)

(72) Inventors: Kihyun Park, Seoul (KR); Daehyun Yoo, Seoul (KR); Kiyoung Lim, Seoul (KR)

(73) Assignee: LG Electronics Inc., Seoul (KR)

( * ) Notice: Subject to any disclaimer, the term of this patent is extended or adjusted under 35 U.S.C. 154(b) by 341 days.

(21) Appl. No.: 16/295,503

(22) Filed: Mar. 7, 2019

(65) Prior Publication Data

US 2019/0280511 A1 Sep. 12, 2019

(30) Foreign Application Priority Data

Mar. 8, 2018 (KR) .................. 10-2018-0027377

(51) Int. Cl.
| | |
|---|---|
| *H02J 50/00* | (2016.01) |
| *H02J 7/02* | (2016.01) |
| *F25D 11/02* | (2006.01) |
| *F25D 15/00* | (2006.01) |
| *F25D 23/00* | (2006.01) |
| *F25D 23/12* | (2006.01) |

(52) U.S. Cl.
CPC ............. *H02J 7/025* (2013.01); *F25D 11/02* (2013.01); *F25D 15/00* (2013.01); *F25D 23/006* (2013.01); *F25D 23/12* (2013.01); *H02J 50/005* (2020.01); *F25D 2323/02* (2013.01); *F25D 2400/40* (2013.01)

(58) Field of Classification Search
CPC .......... H02J 7/025; H02J 50/00; H02J 50/005; F25D 11/02; F25D 15/00; F25D 23/006; F25D 23/12; F25D 2323/02; F25D 2400/40

USPC .................................................. 320/107, 108
See application file for complete search history.

(56) References Cited

U.S. PATENT DOCUMENTS

| | | | | |
|---|---|---|---|---|
| 2008/0165509 A1* | 7/2008 | Kendall | ................ | F25D 23/028 361/735 |
| 2015/0211783 A1* | 7/2015 | Marutani | .............. | F25D 23/028 62/125 |
| 2017/0047769 A1* | 2/2017 | Kim | ...................... | H02J 50/005 |

FOREIGN PATENT DOCUMENTS

| | | |
|---|---|---|
| EP | 2910877 | 8/2015 |
| JP | 2017-026199 | 2/2017 |
| WO | WO2008086132 | 7/2008 |

OTHER PUBLICATIONS

Extended European Search Report in European Application No. 19157451.6, dated Jul. 11, 2019, 5 pages.

\* cited by examiner

*Primary Examiner* — Nathaniel R Pelton
(74) *Attorney, Agent, or Firm* — Fish & Richardson P.C.

(57) ABSTRACT

A refrigerator includes: an inner casing having a storage chamber defined therein; a middle plate surrounding an outer surface of the inner casing; a thermal-insulating material disposed between the inner casing and the middle plate; a module mounting casing fixed to the middle plate and having a top opening and an inserting opening; a cabinet cover to cover the top opening and to define a top appearance of the refrigerator; and a wireless charging module mounted on the module mounting casing through the inserting opening, wherein the wireless charging module includes an coil part for wirelessly-charging a battery of a mobile device placed on the cabinet cover.

20 Claims, 18 Drawing Sheets

REFRIGERATOR

CROSS-REFERENCE TO RELATED APPLICATION

This application is based on and claims the benefit of priority to Korean Patent Application No. 10-2018-0027377, filed on Mar. 8, 2018, in the Korean Intellectual Property Office, the disclosure of which is incorporated herein in its entirety by reference.

BACKGROUND

1. Technical Field

The present disclosure relates to a refrigerator.

2. Description of the Related Art

Generally, a refrigerator is a household appliance that can store objects, such as food, in a low-temperature state in the storage chamber of a cabinet. Because the storage chamber is enclosed by an insulating wall, the interior of the storage chamber may be maintained at a temperature lower than the external temperature.

Depending on the temperature zone of the storage chamber, the storage chamber may be divided into a refrigerating chamber or freezing chamber. The user may store the food in the freezing room or the refrigerating room depending on the type and condition of the food.

The refrigerator may be provided in a built-in type together with other appliances in the kitchen. In this case, the appearance design of the refrigerator is configured to match the kitchen furniture.

In recent years, depending on the various needs of the user, the refrigerator is placed in a living room or a room, not a kitchen. In other words, the installation position of the refrigerator is various.

As the location of the refrigerator varies, the appearance of the refrigerator is configured so that the appearance of the refrigerator goes well with the furniture in the space to install the refrigerator.

Japanese Patent Laid-Open Publication No. 2017-26199, which is a prior art document, discloses a refrigerator capable of charging portable equipment capable of noncontact charging.

SUMMARY

The present embodiment provides a refrigerator that can charge the battery of a mobile device without changing appearance.

In addition, the present invention provides a refrigerator in which the wireless charging module, which may charge a battery of a mobile device, is installed, while deterioration of insulation performance is prevented.

In addition, the present embodiment provides a refrigerator capable of charging a battery of a mobile device when the mobile device is not provided with a wireless charging function.

In one aspect, the present disclosure provides a refrigerator including: an inner casing having a storage chamber defined therein; a middle plate surrounding an outer surface of the inner casing; a thermal-insulating material disposed between the inner casing and the middle plate; a module mounting casing fixed to the middle plate and having a top opening and an inserting opening; a cabinet cover to cover the top opening and to define a top appearance of the refrigerator; and a wireless charging module mounted on the module mounting casing through the inserting opening, wherein the wireless charging module includes a coil part for wirelessly-charging a battery of a mobile device placed on the cabinet cover.

DETAILED DESCRIPTIONS

Figure 1:
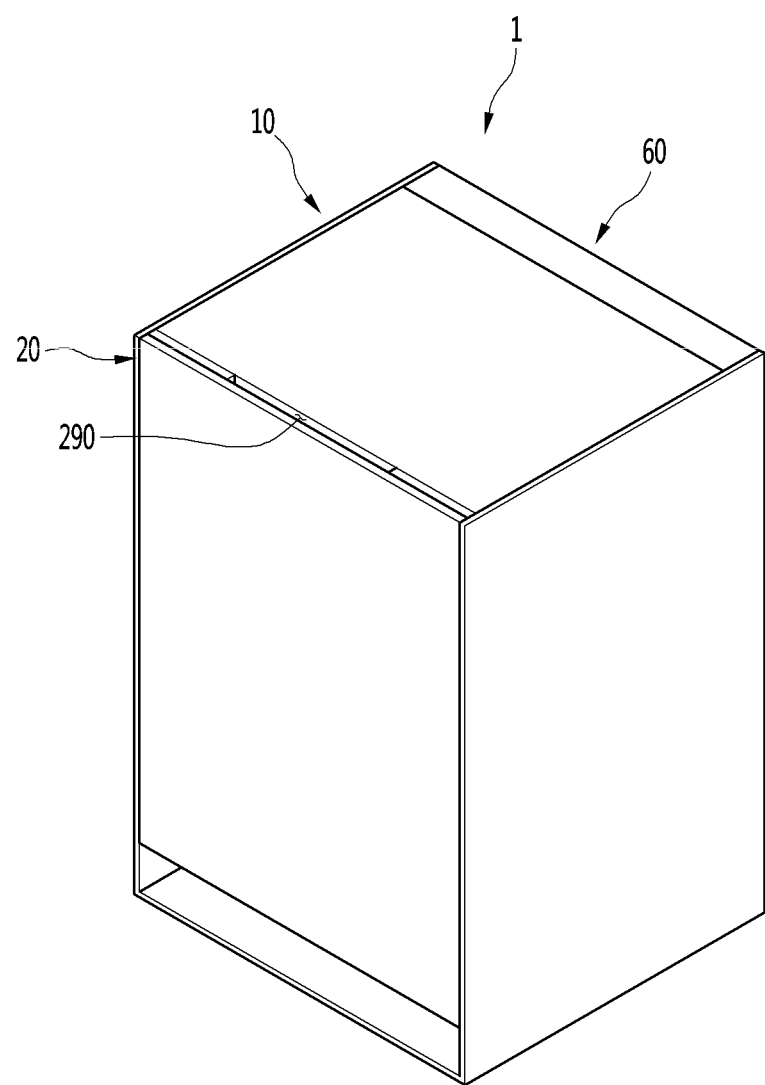
FIG. 1 is a perspective view of a refrigerator according to one embodiment of the present disclosure.

Hereinafter, some embodiments of the present disclosure will be described in detail with reference to the accompanying drawings. It should be noted that when components in the drawings are designated by reference numerals, the same components have the same reference numerals as far as possible even though the components are illustrated in different drawings. Further, in description of embodiments of the present disclosure, when it is determined that detailed descriptions of well-known configurations or functions disturb understanding of the embodiments of the present disclosure, the detailed descriptions will be omitted.

Also, in the description of the embodiments of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

Figure 2:
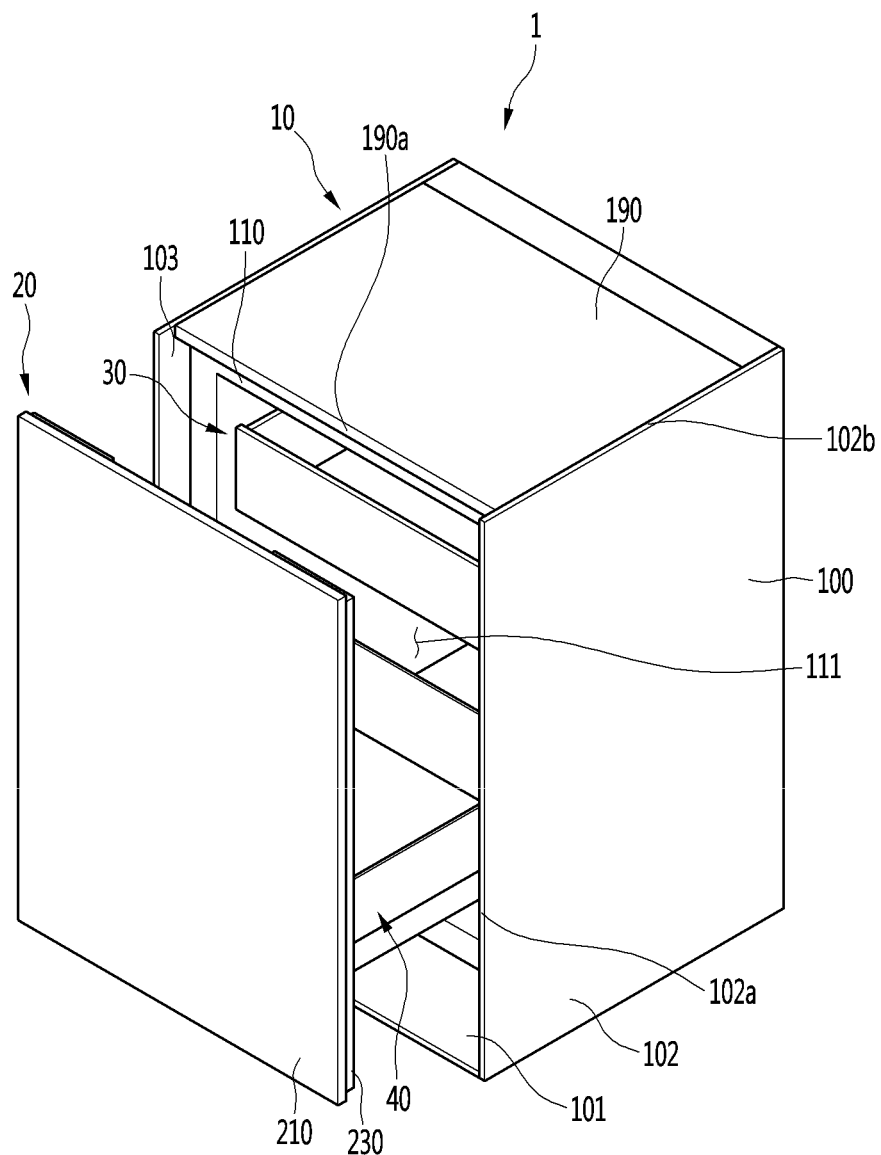
FIG. 2 is a perspective view showing a door being opened in FIG. 1.
Figure 3:
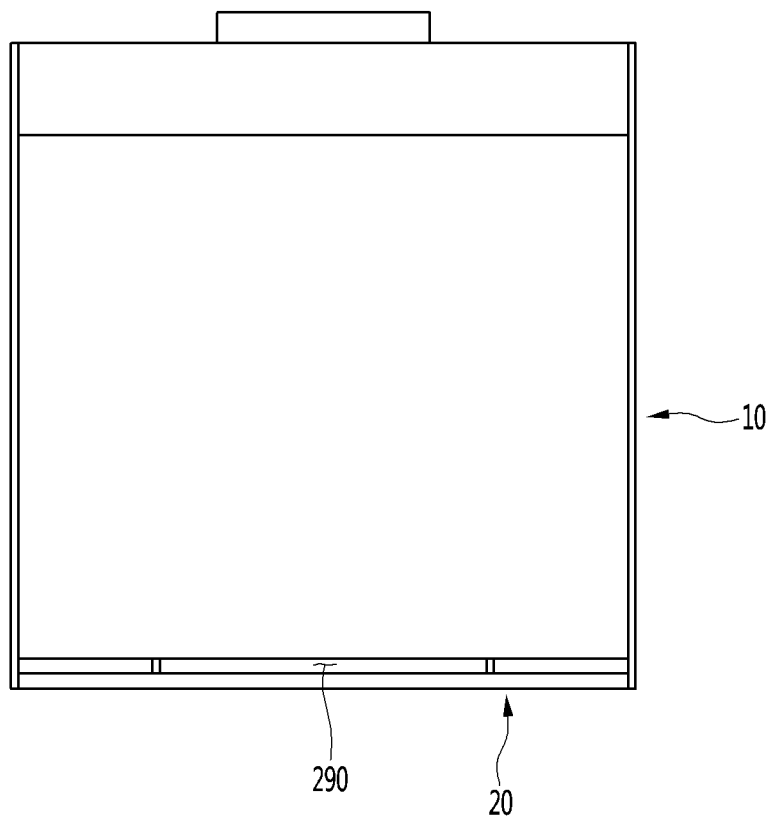
FIG. 3 is a plan view of the refrigerator of FIG. 1.
Figure 4:
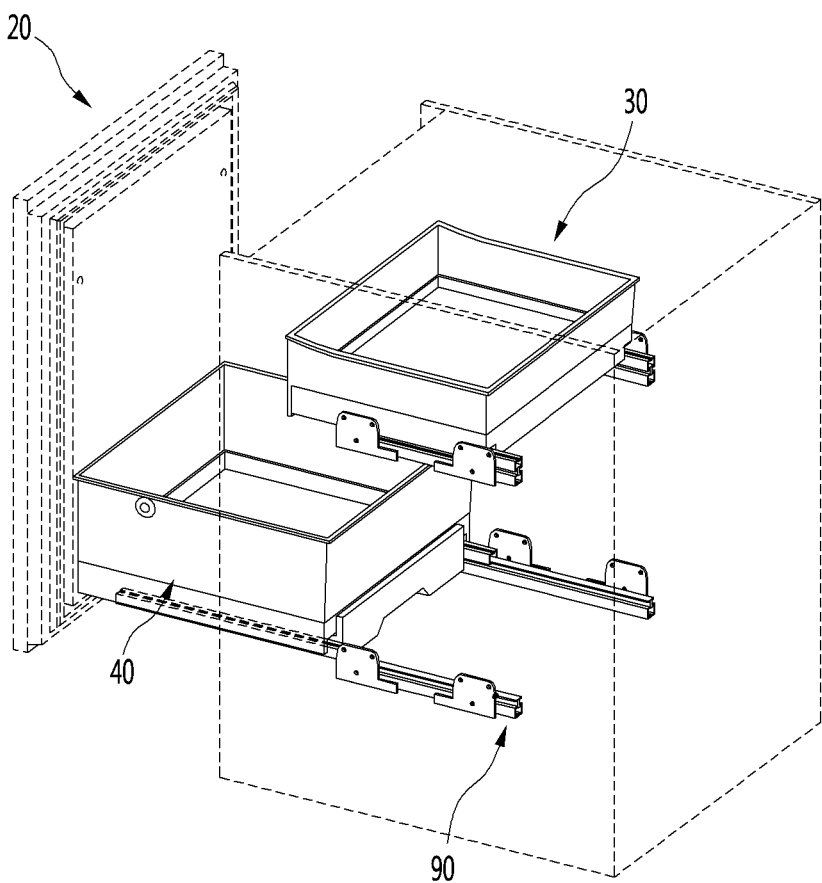
FIG. 4 is a rear perspective view of a refrigerator showing a door being pulled out together with a lower drawer assembly.

FIG. 1 is a perspective view of a refrigerator according to one embodiment of the present disclosure. FIG. 2 is a perspective view showing a door being opened in FIG. 1. FIG. 3 is a plan view of the refrigerator of FIG. 1. FIG. 4 is a rear perspective view of a refrigerator showing a door being pulled out together with a lower drawer assembly.

Referring to FIGS. 1 to 4, a refrigerator 1 according to one embodiment of the present disclosure may include a cabinet 10 having a storage chamber 111, a door 20, which opens and closes the storage chamber 111, and connected to the cabinet 10.

The cabinet 10 may include the inner casing 110 forming the storage chamber 111, and an outer casing 100 surrounding the inner casing 110.

The outer casing 100 may be formed of a metal material. For example, the outer casing 100 may be formed of aluminum Al. The outer casing 100 may be formed by bending a plate at least twice. Alternatively, the outer casing 100 may be formed by joining a plurality of metal plates.

In one example, the outer casing 100 may include a pair of side panels 102 and 103.

The inner casing 110 may be directly or indirectly fixed to the outer casing 100 with the inner casing 110 being positioned between the pair of side panels 102 and 103.

A front end 102a of each of the pair of side panels 102 and 103 may be located more forwards than the front face of the inner casing 110. The horizontal width of the door 20 may be equal to or less than the distance between the side panels 102 and 103.

Thus, a space in which the door 20 may be located may be defined between the pair of side panels 102 and 103.

In one example, the door 20 may be located between the pair of side panels 102 and 103 with the storage chamber 111 being closed by the door.

In this connection, the front face of the door 20 may be coplanar with a front end 102a of each of the side panels 102 and 103 such that a step between the door 20 and the cabinet 10 may not occur when the storage chamber 111 is closed by the door.

That is, the front face of the door 20 and a front end 102a of each of the side panels 102 and 103 may together define the appearance of the front face of the refrigerator 1.

The door 20 may include a front face panel 210 and a door liner 230 coupled to a rear surface of the front face panel 210.

The front face panel 210 may be formed of a wood material. However, the present disclosure is not limited thereto.

In one example, the front face panel 210 and the door liner 230 may be engaged with each other by fasteners such as screws. The front face panel 210 and the door liner 230 form a foam space therebetween. When the foam liquid is filled in the foam space, a thermal-insulating material may be formed between the front face panel 210 and the door liner 230.

The door 20 may have a gripping space 290 in which a user's hand may be inserted so that the user can catch the door 20 to open the door 20.

In one example, the gripping space 290 may be formed by partially recessing an upper portion of the door liner 230 downwardly.

While the door 20 closes the storage chamber 111, the gripping space 290 may be located between the front face panel 210 and the cabinet 10. Thus, while the door 20 closes the storage chamber 111, the user may open the door 20 by inserting a hand into the gripping space 290 and then pulling the door 20.

In the present embodiment, since while the door 20 is closed, a structure such as a handle does not protrude outward, there is an advantage that the beauty of refrigerator 1 is improved.

The height of the refrigerator 1 may be lower than a typical adult height. The present disclosure may not be limited thereto. The lower the capacity of the refrigerator 1, the lower the height of the refrigerator 1.

As in the present embodiment, when there is a gripping space 290 within the top of the door 20, the following advantage is achieved: Even though the height of the refrigerator 1 is low, the user can easily open the door 20 while the user is standing or sitting.

In one embodiment, the top end 102b of each of the pair of side panels 102 and 103 may be higher than the top of the inner casing 110.

Therefore, a space may be formed above the inner casing 110. A cabinet cover 190 may be located in the space. The cabinet cover 190 may form a top appearance of the cabinet 10. That is, the cabinet cover 190 forms a top appearance of the refrigerator 1.

The cabinet cover 190 may be secured directly to the inner casing 110 or to the middle plate 150 surrounding the inner casing 110.

While the cabinet cover 190 covers the inner casing 110, the cabinet cover 190 may be located between the pair of side panels 102 and 103.

In one embodiment, in order to avoid a step between the cabinet cover 190 and the cabinet 10, a top surface of the cabinet cover 190 may be located on the same plane or the same height as the top end 102b of each of the side panels 102 and 103.

In one example, the cabinet cover 190 may be formed of wood material. The present disclosure is not so limited.

That is, the front face panel 210 and the cabinet cover 190 may be formed of the same material.

In the present embodiment, the front face panel 210 of the door 20 and the cabinet cover 190 are both formed of a wood material. Thus, there is an advantage that the aesthetics can be improved due to the material identity between the door 20 and the cabinet cover 190 while the door 20 is closed.

Further, when the height of the refrigerator 1 is low, the user can visually check the cabinet cover 190. In this connection, since the cabinet cover 190 is made of the wood material, this has the advantage of not only improving the basic aesthetics but also achieving aesthetic harmony with the surrounding furniture where the refrigerator 1 is positioned.

In one example, the refrigerator 1 of the present embodiment may be implemented as a refrigerator that can be used as a table (hereinafter, a table type refrigerator).

A refrigerator that can be used as a table may also serve as a table function in addition to the storage function of foods. Unlike conventional refrigerators, which are often found in the kitchen, a refrigerator, which can be used as a table, may be placed next to the bedroom bed and may be used. In the present embodiment, since the cabinet cover 190 and the front face panel 210 are formed of wood material, the appearance of the refrigerator may be in harmony with the surrounding furniture when the refrigerator 1 is placed next to the bedroom.

In one example, for the convenience of the user, the height of the table type refrigerator is preferably similar to the height of the bed. The height of the table type refrigerator may be smaller than the height of a conventional refrigerator and thus the refrigerator may be formed compactly.

A front face 190a of the cabinet cover 190 may be located more forwards than the front face of the inner casing 110. Thus, while the door 20 closes the storage chamber 111, the cabinet cover 190 may cover a portion of the door liner 230 from above.

The refrigerator 1 may further include one or more drawer assemblies 30 and 40 received in the storage chamber 111.

A plurality of drawer assemblies 30 and 40 may be provided in the storage chamber 111 for efficient storage space.

The multiple drawer assemblies 30 and 40 may include upper drawer assembly 30 and lower drawer assembly 40. In some cases, the upper drawer assembly 30 may be omitted.

The door 20 may open and close the storage chamber 111 while sliding in a forward and backward direction.

In the present embodiment, even when the refrigerator 1 is placed in a narrow space such as a kitchen, living room, or room, the user has the advantage that the door 20 can be opened without interfering with the surrounding structure since the door 20 opens and closes the storage chamber 111 in the sliding manner.

In order that the door 20 is slid in and out, the refrigerator 1 may also include a rail assembly 90.

One side of the rail assembly 90 may be connected to the door and the other side of the rail assembly 90 may be connected to the lower drawer assembly 40.

Thus, since the door 20 is connected to the lower drawer assembly 40, and the lower drawer assembly 40 is connected to the rail assembly 90, the lower drawer assembly 40 may be withdrawn out of the storage chamber 111 via the rail assembly 90 during the opening of the door 20.

The upper drawer assembly 30 may be manually withdrawn out of the storage chamber 111 or may be drawn into the storage chamber 111 by the user. Alternatively, the upper assembly 30 may be configured to be slidably withdrawn out along with the door 20 at an initial opening stage of the door 20, and to stop at a position drawn out at a predetermined distance. To this end, one or more of the upper drawer assembly 30 and the door 20 may be provided with magnets.

Figure 5:
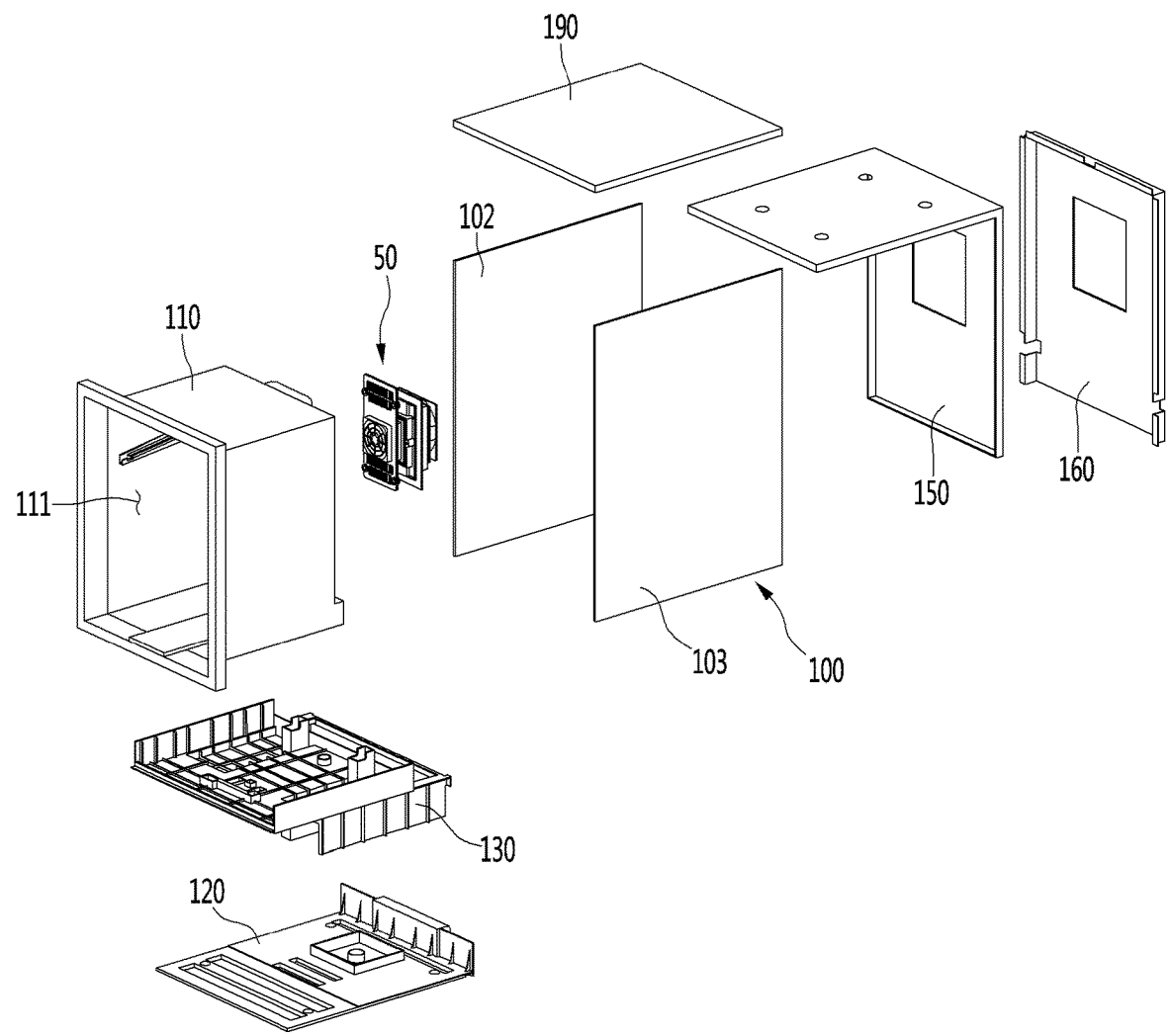
FIG. 5 is an exploded perspective view of a cabinet according to one embodiment of the present disclosure.

FIG. 5 is an exploded perspective view of a cabinet according to one embodiment of the present disclosure.

Referring to FIGS. 1 to 5, a cabinet 10 according to one embodiment of the present disclosure may include an outer casing 100, an inner casing 110, and a cabinet cover 190.

The outer casing 100 may include a pair of side panels 102 and 103. The pair of side panels 102, 102 may form the side appearance of the refrigerator 1.

The outer casing 100 may further include a rear panel 160 that forms the rear surface appearance of the refrigerator 1.

Thus, the appearance of the refrigerator 1 except the door 20 may be formed by the side panels 102 and 103, the cabinet cover 190 and the rear panel 160.

The cabinet 10 may further include a casing supporter 130 supporting the inner casing 110 and a base 120 coupled to the bottom of the casing supporter 130.

The cabinet 10 may also include a middle plate 150. The middle plate, together with the inner casing 110, forms a foam space. The middle plate 150 may cover the top and rear surfaces of the inner casing 110 at a spaced apart position from the inner casing 110.

A display unit 60 may be coupled to at least one of the middle plate 150 and the side panels 102 and 103.

The cabinet 10 may further include a cooling device 50 for cooling the storage chamber 111. The cooling device 50 may include a thermoelectric module, and the thermoelectric module may reduce the size of the refrigerator. The thermoelectric module may include a thermoelectric element, a cooling fan, and a heat-dissipation fan. The thermoelectric element may include a low-temperature portion and a high-temperature portion. Since the thermoelectric module itself is a well-known technology, the details of the operating principle thereof are omitted.

A foam space may be formed by the inner casing 110, the side panels 102 and 103, the casing supporter 130 and the middle plate 150, such that the foam space may be filled with a foam liquid for forming a thermal-insulating material.

Figure 6:
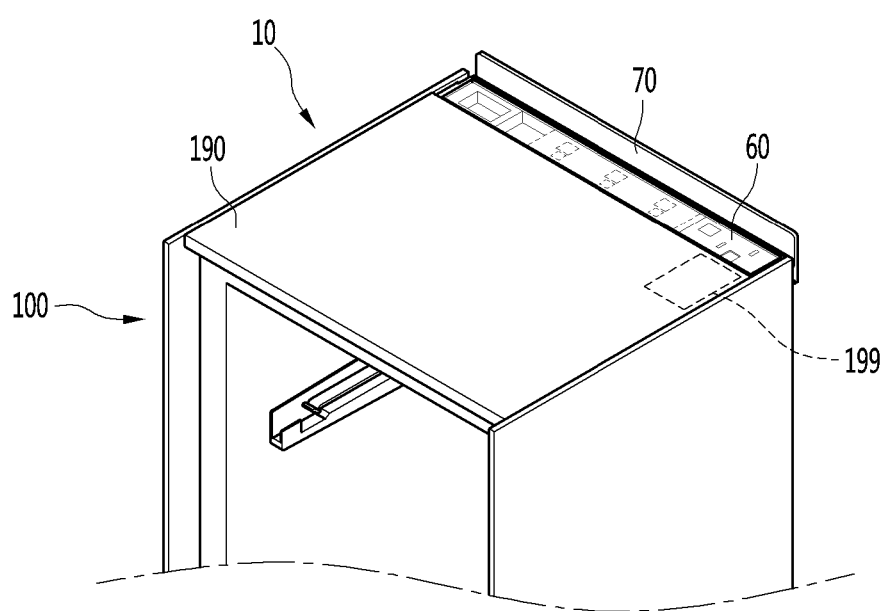
FIG. 6 is a view showing the position of a display unit in a refrigerator according to one embodiment of the present disclosure.
Figure 7:
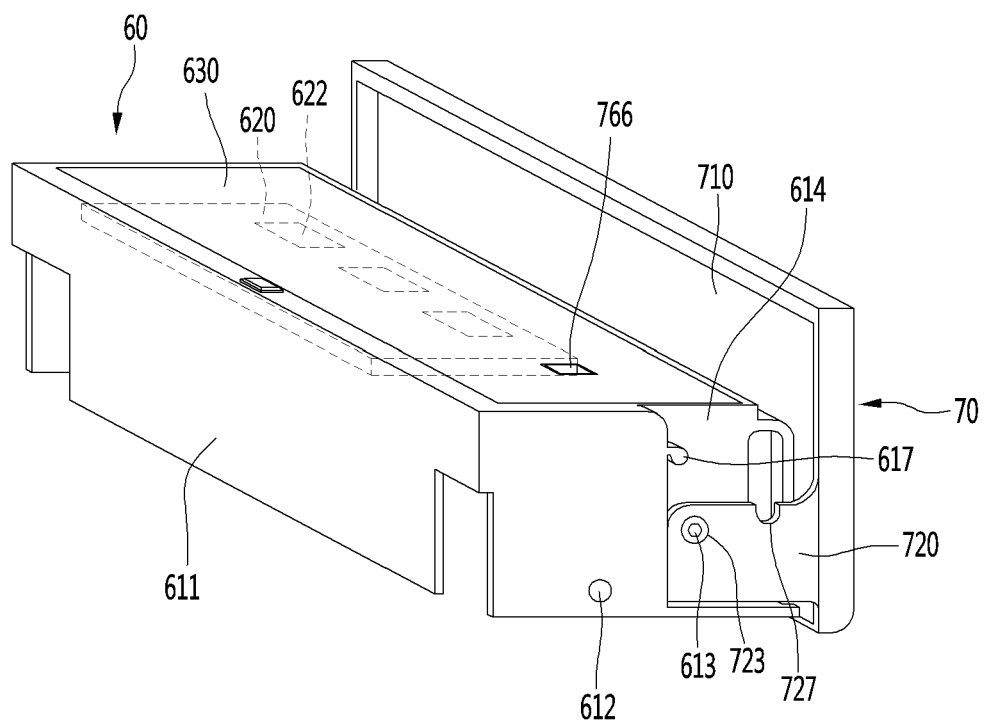
FIG. 7 is a perspective view of a display unit according to one embodiment of the present disclosure.

FIG. 6 is a view showing a location of the display unit in a refrigerator according to one embodiment of the present disclosure. FIG. 7 is a perspective view of the display unit according to one embodiment of the present disclosure.

FIG. 7 shows a display cover in a rotated state.

Referring to FIG. 1, FIG. 6 and FIG. 7, a display unit 60 may be installed on the top rear of the cabinet 10.

The display unit 60 can display the operating status of the refrigerator 1 or receive commands from the user.

The display unit 60 may be located on the rear side of the cabinet cover 190 and may be covered by a display cover 70.

As shown in FIG. 1, while the display cover 70 covers the display unit 60, the display unit 60 is prevented from being exposed to the outside.

Further, the display cover 70 forms a top appearance of the refrigerator 1 together with the cabinet cover 190. That is, while the display cover 70 covers the display unit 60, a top surface of the display cover 70 may be located at the same height as the cabinet cover 190.

Thus, a top surface of the display cover 70 and the cabinet cover 190 may form a continuous surface.

According to the present embodiment, the exterior of the display unit 60 is prevented from being exposed to the outside, which makes the appearance of the refrigerator 1 neat.

Since the display unit 60 is located above the cabinet 10, the display unit 60 can be easily seen by the user while the display cover 70 is rotated although the height of the refrigerator 1 is low.

In addition, since the display cover 70 covers the display unit 60, water or liquid may be prevented from flowing into the interior of the display unit 60 even when water or liquid falls from a top surface of the refrigerator 1.

The display unit 60 may include a display casing 611 and a display PCB (Printed Circuit Board) 620 accommodated in the display casing 611.

The display PCB 620 may be provided with one or more light-emitting units 622. In one example, the display PCB 620 may be installed in the display casing 610 while the one or more light-emitting units 622 are arranged to face upward.

The display unit 60 may further include a display panel 630. The display panel 630 covers the top of the display PCB 620 while the display PCB 620 is installed in the display casing 611.

The display panel 630 may be coupled to the top of the display casing 610. The light illuminated from the light-emitting unit 622 may be transmitted through the display panel 630.

In one example, the display casing 611 may be mounted on the side panels 102 and 103 by bolts. In one example, both opposite edges of the display casing 611 may has engagement holes 612 defined therein for bolt engagement.

The display cover 70 may be rotatably coupled to the display casing 610. As another example, the display cover 70 may be rotatably coupled to a component of the cabinet 10. In one example, while the display cover 70 is coupled to the respective side panels 102 and 103, the display cover 70 may cover the display unit 60.

The display cover 70 may include a cover plate 710 for covering a top surface of the display unit 60 and a pair of extensions 720 extending from both ends of the cover plate 710.

The pair of extensions 720 are coupled to both opposite sides of the display casing 611 respectively. To prevent the pair of extensions 720 from projecting outward while the pair of extensions 720 are coupled to the display casing 611, a receiving groove 614 for the seating of each extension 720 may be formed in each of both opposite sides of the display casing 611.

While the display unit 60 is coupled to the respective side panels 102 and 103, each extension 720 may be located between a portion of the display casing 611 and the respective side panels 102 and 103.

Each of both opposite sides of the display casing 611 may be provided with a hinge shaft 613 for providing the rotation center of the display cover 70.

The hinge shaft 613 may protrude from each of both opposing sides of the display casing 611. In one example, the hinge shaft 613 may protrude in the horizontal direction from the receiving groove 614.

Each extension 720 may have a shaft hole 723 defined therein through which the hinge shaft 613 passes.

While the hinge shaft 613 passes through the shaft hole 723, the display cover 70 may be rotated about the hinge shaft 613.

The display cover 70 may rotate in a range between a first position and a second position. In the first position, the display cover 70 covers the top surface of the display unit 60 (or display panel 30). In the second position, the top surface of the display 60 (or display panel 30) is exposed to the outside.

In this connection, the display cover 70 is rotated in the first position away from the cabinet cover 190. Thus, in the process of rotation of the display cover 70, the display cover may be prevented from interfering with the cabinet cover 190.

In one of the display casing 611 and the display cover 740, a rotation limitation protrusion 617 may be formed, while a protrusion groove 727 for receiving the rotation limitation protrusion 617 may be formed in the other thereof. In this way, the display cover 70 is fixed in position while the display cover 70 is rotated toward the first position.

In FIG. 7, in one example, the rotation limitation protrusion 617 is formed on the display casing 611, while the protrusion groove 727 is formed in the extension 720 of the display cover 70.

In the present embodiment, while the display cover 70 is positioned in the second position, the rotation limitation protrusion 617 is fitted in the protrusion groove 727. Thus, even when the object placed on the cabinet cover 190 slips on the cabinet cover 190, the display cover 70 may be prevented from being rotated by the object.

In one embodiment, the refrigerator of the present embodiment may further include the wireless charging module (see 80 in FIG. 9), which may wirelessly charge the battery of the mobile device. While the wireless charging module 80 is not exposed to the outside, the wireless charging module 80 may be located on an upper portion of the refrigerator.

On the cabinet cover 190, a position guide mark 199 may be provided for guiding the location where the mobile device will be placed for charging the mobile device. The guide mark 199 may be attached to the cabinet cover 190. Alternatively, a portion of the cabinet cover 190 may be deformed to form the guide mark. The mark may be provided in a printed form.

Further, on the cabinet cover 190, the position guide mark 199 may be located adjacent to the display unit 60. For example, the position guide mark 199 may be located adjacent to the rear end of the cabinet cover 190.

In order for the mobile device to be wirelessly charged by the wireless charging module 80, the mobile device must have a wireless charging capability.

The wireless charging module 80 may include a primary coil (not shown) while the mobile device may include a secondary coil. When a current is applied to the primary coil, magnetism is induced in the secondary coil by electromagnetic induction phenomenon. The magnetism induced in the secondary coil may be converted to current, which may charge the battery of the mobile device.

However, when the mobile device does not include a wireless rechargeable feature, the battery of the mobile device cannot be charged wirelessly.

Thus, in the present embodiment, in this case, in order to enable wired charging of the mobile device, the display unit 60 may further include a charging port 766 for connecting a charging cable connected to the mobile device.

Figure 8:
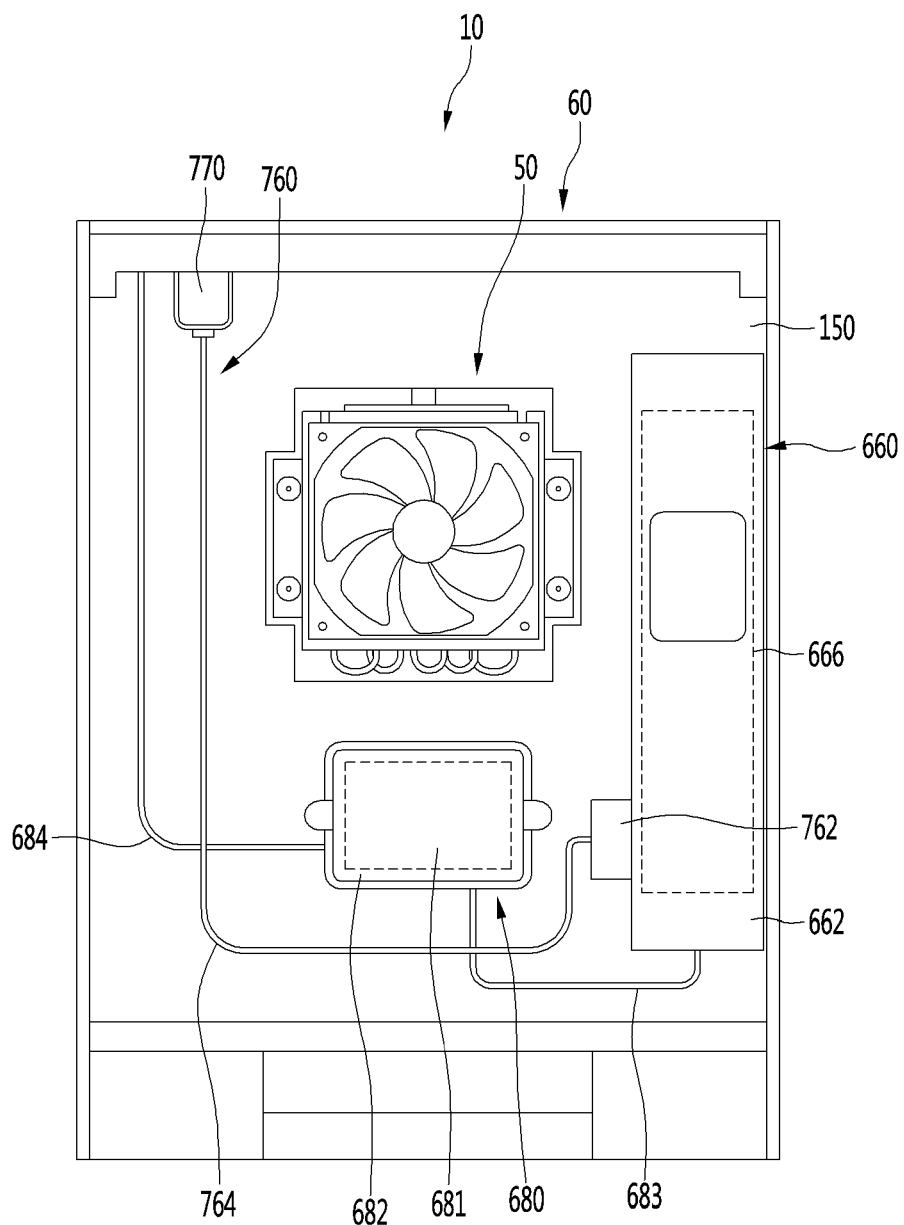
FIG. 8 is a perspective view of a refrigerator in which a rear panel of a refrigerator is removed according to one embodiment of the present disclosure.

FIG. 8 is a perspective view of a refrigerator with a rear panel being removed from the refrigerator according to one embodiment of the present disclosure.

Referring to FIG. 8, in the present embodiment, the display unit 60 may be placed on the cooling device 50, while a main controller 660 (or a first controller) may be disposed on one side of the cooling device 50.

Further, an auxiliary controller 680 (or a second controller) may be provided under the cooling device 50.

The main controller 660 may control the cooling device 50 and may be connected to the display PCB 620 of the display unit 60.

The main controller 660 may be supplied with AC power. Thus, the main controller 660 may supply power to the cooling device (in one example, the thermoelectric element, the cooling fan and the heat-dissipation fan) 50 and the display unit 60.

In this connection, the main controller 660 transforms the voltage supplied thereto and supplies the transformed voltage to the cooling device 50 and the display unit 60.

The main controller 660 may include a main PCB 666 and a main PCB housing 662 that protects the main PCB 666. In one example, the main PCB housing 662 may be secured to the middle plate 150.

The refrigerator 1 may also include a USB charge device 760 for charging the battery of the user's mobile device (mobile phone, tablet, etc.).

The user can charge the battery of the mobile device by connecting the charging cable connected to the mobile device to the USB charge device 760.

The USB charge device 760 may include a USB charge module (hereinafter referred to as a USB module 762) connected to the main PCB 666 and supplied with power, and a charging port 766 for connecting to the charging cable connected to the mobile device.

The USB module 762 may also include a circuit for charging the battery. In one example, the USB module 762 may be installed in the main PCB housing 662 of the main PCB.

The charging port 766 may be disposed within the display unit 60. The charging port 766 may be exposed to the outside in a state in which the display cover 70 has been rotated to the second position.

On the other hand, the charging port 766 may be covered by the display cover 70 while the display cover 70 has been rotated to the first position. Accordingly, since the exposure of the port 766 to the outside is blocked while the display cover 70 is located in the first position, such that foreign substances may be prevented from entering the charging port 766.

The charging port 766 may be supported by a port supporter 770. The port supporter 770 may be engaged with the display casing 611 or the display PCB 620.

The charging port 766 may be connected to the USB module 762 via a connection cable 764.

The auxiliary controller 680 may include an auxiliary PCB 681 and an auxiliary PCB housing 682 that protects the auxiliary PCB 681. In one example, the auxiliary PCB 681 may be secured to the middle plate 150.

The main PCB 666 and the auxiliary PCB 681 may be connected via a first connection cable 683. The auxiliary PCB 681 and the wireless charging module 80 may be connected via a second connection cable 684.

The AC power is applied from the main PCB 666 to the auxiliary PCB 681 via the first connection cable 683. Then, the auxiliary PCB 681 converts the AC power to DC power. The, the DC power may be applied to the wireless charging module 80 via the second connection cable 684.

In the present embodiment, when the refrigerator 1 functions as a table, a refrigerator 1 may be placed around the bed. In this connection, while the mobile device is placed on a top surface of refrigerator 1, the user may charge the battery of the mobile device by connecting the charging cable connected to the mobile device to the charging port 766. Thus, the convenience of the user may be improved.

In addition, when the mobile device has a wireless charging function, the user placing the mobile device on the position guide mark 199 of the cabinet cover 190 may result in that the battery of the mobile device can be charged by the wireless charging module 80. Thus, the convenience of the user may be improved.

Figure 9:
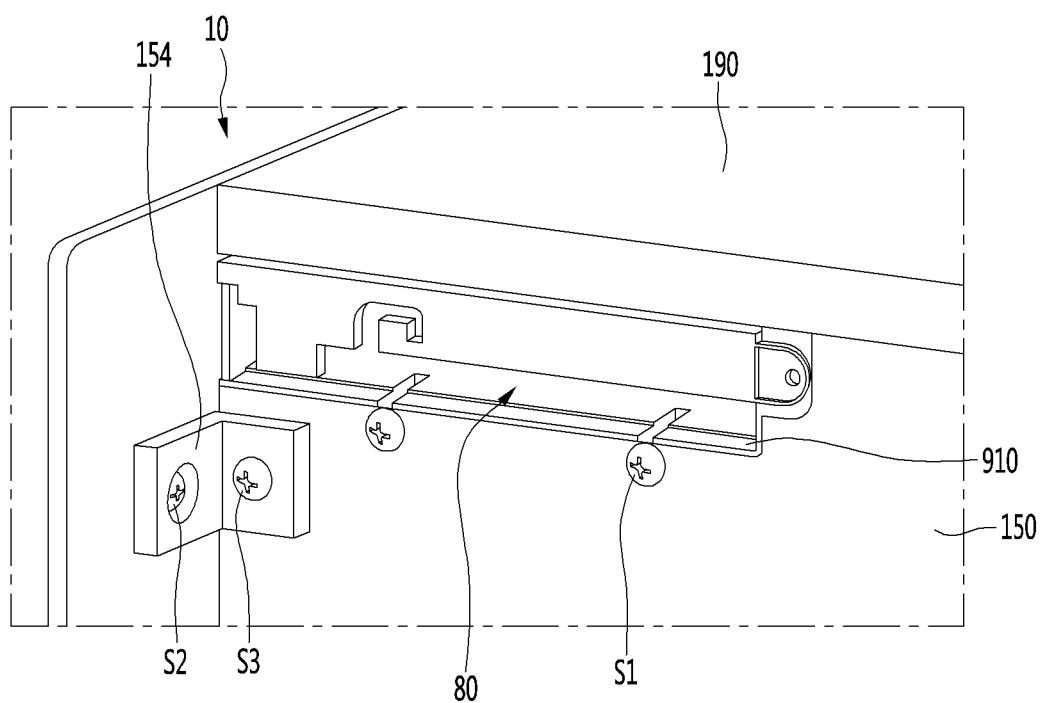
FIG. 9 is a view showing a wireless charging module mounted on a refrigerator according to one embodiment of the present disclosure.
Figure 10:
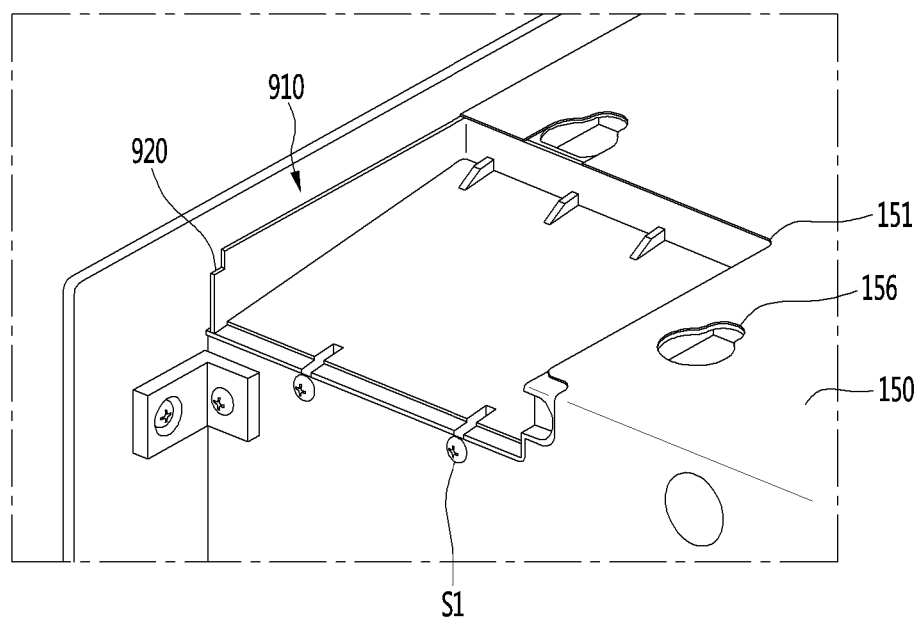
FIG. 10 is a view showing a module mounting casing for mounting the wireless charging module.

FIG. 9 shows a state where the wireless charging module is installed in a refrigerator according to one embodiment of the present disclosure. FIG. 10 shows a state in which a module mounting casing for mounting the wireless charging module thereon is installed on the middle plate.

Figure 11:
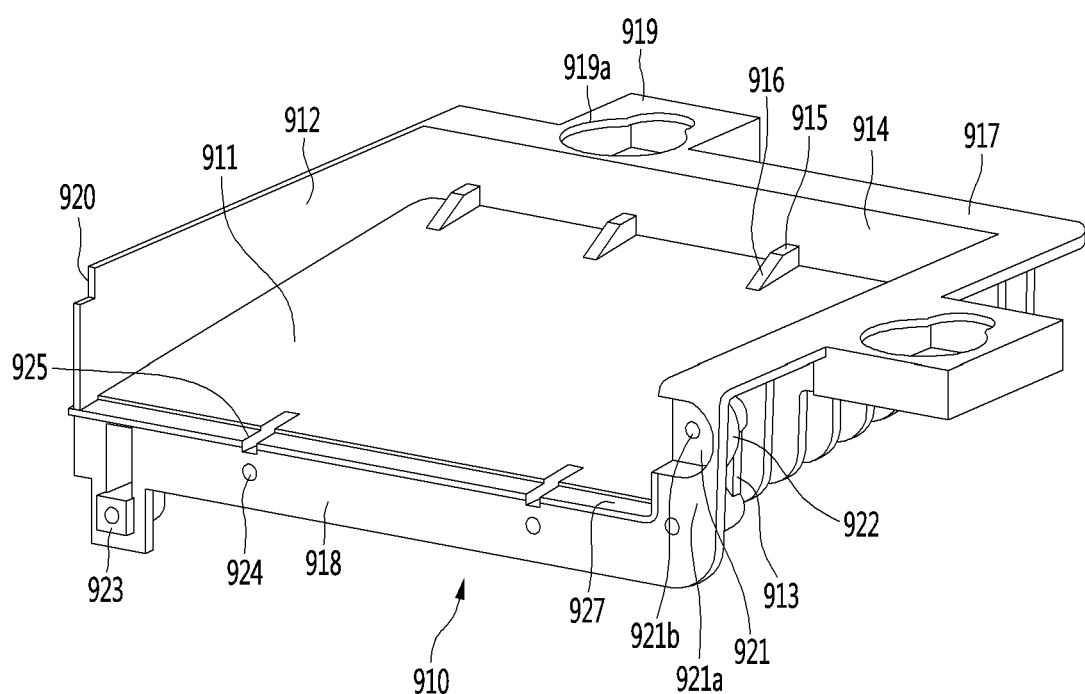
FIG. 11 is a perspective view of the module mounting casing according to one embodiment of the present disclosure.
Figure 12:
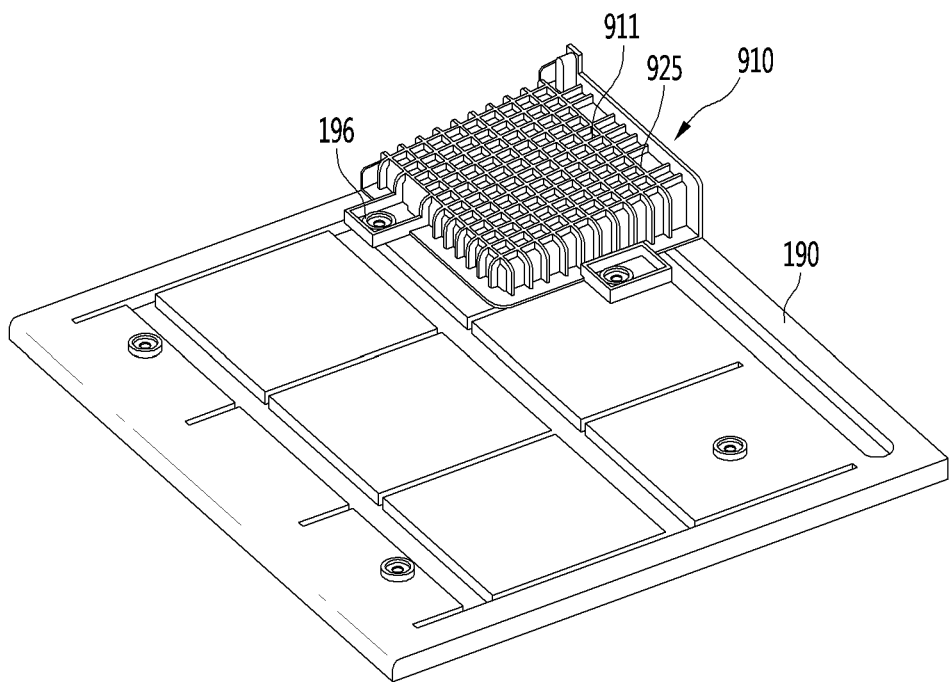
FIG. 12 is a view showing a state in which a cabinet cover and a module mounting casing are combined.

FIG. 11 is a perspective view of the module mounting casing according to one embodiment of the present disclosure. FIG. 12 shows a combination of the cabinet cover and the module mounting casing.

Referring to FIG. 9 to FIG. 12, the refrigerator 1 may further include a module mounting casing 910 for mounting the wireless charging module 80 thereon. In one example, the module mounting casing 910 may be engaged with the middle plate 150 by a screw S1.

The middle plate 150 may have a cutout 151 defined therein for the module mounting casing 910 to be positioned therein. The cutout 151 may be located at the upper corner of the middle plate 150.

The module mounting casing 910 may be located at an upper portion of the rear surface of the refrigerator 1.

The wireless charging module 80 may be mounted on the module mounting casing 910. In a state in which the wireless charging module 80 is mounted on the module mounting casing 910, the wireless charging module 80 may be covered by the cabinet cover 190.

The rear surface and top surface of the module mounting casing 910 are opened and the casing 910 may have a frame shape. That is, the module mounting casing 910 may include a top opening and a rear opening 927. The front surface of the module mounting casing 910 is facing the door 20 of the refrigerator 1, while the rear surface is opposite to the front face.

In the module mounting casing 910, the rear opening 927 (which may be referred to as an inserting opening) serves as an access port for the wireless charging module 80 to be mounted into or detached from the casing 910.

In the module mounting casing 910, the top surface is opened to reduce the spacing between the wireless charging module 80 and the mobile device placed on the cabinet cover 190 for wireless charging.

The module mounting casing 910 may include a bottom wall 911, both side walls 912, 913 extending from the bottom wall 911, and a front wall 914.

The front wall 914 may extend upward from a front end of the bottom wall 911.

The bottom wall 911 may extend in an inclined manner. In one example, the bottom wall 911 may be inclined upwardly from the rear opening 927 toward the front wall 914.

This allows the wireless charging module 80 to be easily inserted into the module mounting casing 910 from the rear opening 927. Further, while the wireless charging module 80 has been mounted, the distance between the wireless charging module 80 and the cabinet cover 190 may be minimized.

The bottom wall 911 may include a support protrusion 915 supporting the bottom of the wireless charging module 80 in the process of mounting the wireless charging module 80.

The support protrusion 915 may protrude upward from the bottom wall 911. For the stable support of the wireless charging module 80 thereon, a plurality of the support protrusions 915 may protrude from the bottom wall 911. The present disclosure is not limited to the above-described configuration.

The plurality of support protrusions 915 may be integrally formed with the front wall 914 and the bottom wall 911 to prevent the plurality of support protrusions 915 from being damaged.

Each of the plurality of support protrusions 915 may have a top inclined surface 916 such that the wireless charging module 80 is easily supported on the plurality of support protrusions 915.

Thus, during the process of inserting the wireless charging module 80 into the module mounting casing 910, the front side of the bottom of the wireless charging module 80 rises along the top inclined surface 916 such that the wireless charging module 80 may then be seated on the top surface of the support protrusion 915.

The module mounting casing 910 may further include a horizontal extension 917 to increase the contact area thereof with the middle plate 150. The horizontal extension 917 may extend in the horizontal direction from the top edge of the module mounting casing 910.

In one example, the horizontal extension 917 may extend in a horizontal direction from the second side wall 913 of the both side walls 912 and 913 and the front wall 914.

In one example, the horizontal extension 917 may be adhered to the inner surface of the middle plate 150 by an adhesive or an adhesive tape.

The module mounting casing 910 may further include a vertical extension 918 to increase the contact area thereof with the middle plate 150. The vertical extension 918 may extend in a vertical direction from a lower end of the module mounting casing 910. In one example, the vertical extension 918 may extend downward from the bottom wall 911.

In one example, the vertical extension 918 may be adhered to the inner surface of the middle plate 150 by an adhesive or adhesive tape.

In the vertical extension 918, an engagement hole 924 for engaging the screw S1 may be formed.

In an upper portion of the portion of the bottom wall 911 that is received within the engagement hole 924, a reinforcement groove 925 having a recessed shape for strength reinforcement may be formed. During the engagement of the screw S1 into the engagement hole 924, the reinforcement groove 925 may also prevent deformation of the connection portion between the bottom wall 911 and the vertical extension 918. In one example, the reinforcement groove 925 may be formed to overlap with the engagement hole 924 in a vertical direction.

The module mounting casing 910 may further include an extended rib 921a extending outwardly from the second side wall 913 of the both side walls. In addition, the extended rib 921a may extend downwardly from the horizontal extension 917.

In the extended rib 921a, a receiving groove 921 for receiving the engagement portion 843 of the wireless charging module 80 may be formed. An engagement boss 922 may extend from a portion of the extended rib 921a corresponding to the receiving groove 921.

Further, an engagement hole 921b may be formed in each of the receiving groove 921 and the engagement boss 922.

In order to fix the position of the module 910 before the wireless charging module 80 is engaged to the module mounting casing 910, a protrusion receiving groove 920 for receiving a positioning protrusion 842 of the wireless charging module 80 therein may be formed in the module mounting casing 910.

In one example, the protrusion receiving groove 920 may be formed in the top of the first side wall 912 of the both side walls. Thus, while the positioning protrusion 842 of the wireless charging module 80 has been seated in the protrusion receiving groove 920, the wireless charging module 80 may be prevented from bending downward.

The module mounting casing 910 may further include a cover coupling portion 919 to couple with the cabinet cover 190. The cover coupling portion 919 may protrude from the horizontal extension 917.

An engagement slot 919a may be formed in the cover coupling portion 919.

A plurality of cover-coupling portions 919 may be provided on the module mounting casing 910. The present disclosure is not limited to the above-described configuration. Some of the plurality of cover coupling portions 919 may be integrally formed with the front wall 914, while the other cover coupling portions of the plurality of cover coupling portions 919 may be integrally formed with the second side wall 913 of the both side walls.

Referring to FIG. 12, the cabinet cover 190 may have a coupling part 196. The coupling part 196 may be engaged within the engagement slot 919a. In this connection, since the horizontal extension 917 of the module mounting casing 190 is in contact with the inner surface of the middle plate 150, a through hole 156 through which the coupling part 915 passes may be formed in the middle plate 150 to couple the coupling part 915 into the engagement slot 919a. The through hole 156 may be formed in a shape corresponding to the engagement slot 919a.

The outer surface of the module mounting casing 910 may be provided with a reinforcement rib 925 for strength reinforcement. The reinforcement rib 925 may be formed in a grid shape, but the shape is not limited thereto.

In one embodiment, the middle plate 150 may be connected via a connection member 154 to the side panels 102 and 103. The connection member 154 may be bent and formed in a substantially L shape. Thus, a first screw S2 may penetrate a portion of the connection member 154 and then engage with the side panels 102 and 103. A second screw S3 may pass through another portion of the connection member 154 and then engage the middle plate 150.

The module mounting casing 910 may further include a screw engagement portion 923 for engagement with the second screw S3. The second screw S3 may pass through the middle plate 150 and be engaged with the screw engagement portion 923.

Thus, in the present embodiment, the module mounting casing 910 is indirectly engaged to the side panels 102 and 103 by the connection member 154 as well as directly to the middle plate 150. The combination of the module mounting casing 910 may be advantageously robust.

Figure 13:
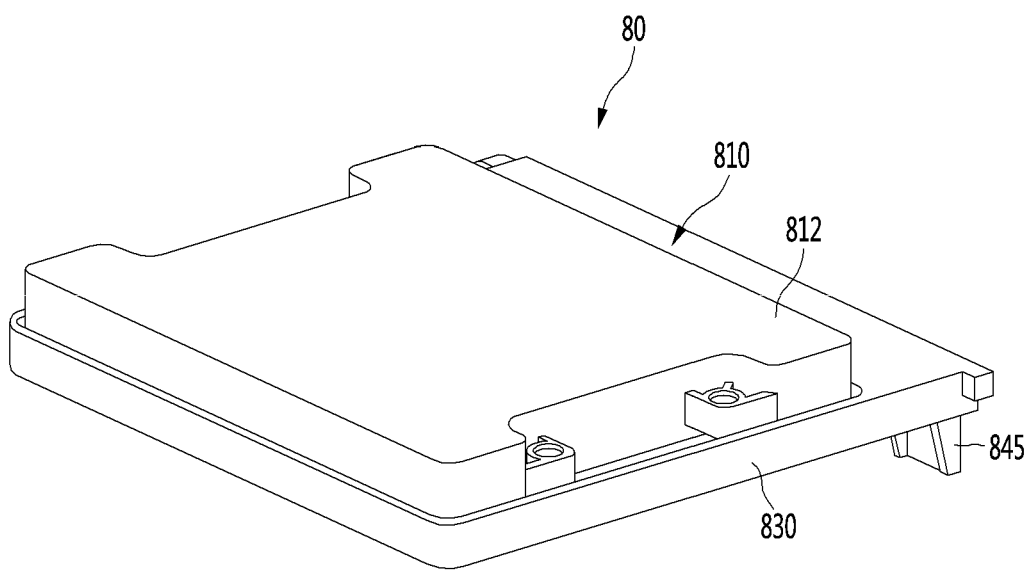
FIG. 13 to FIG. 15 are perspective views of the wireless charging module according to one embodiment of the present disclosure.
Figure 14:
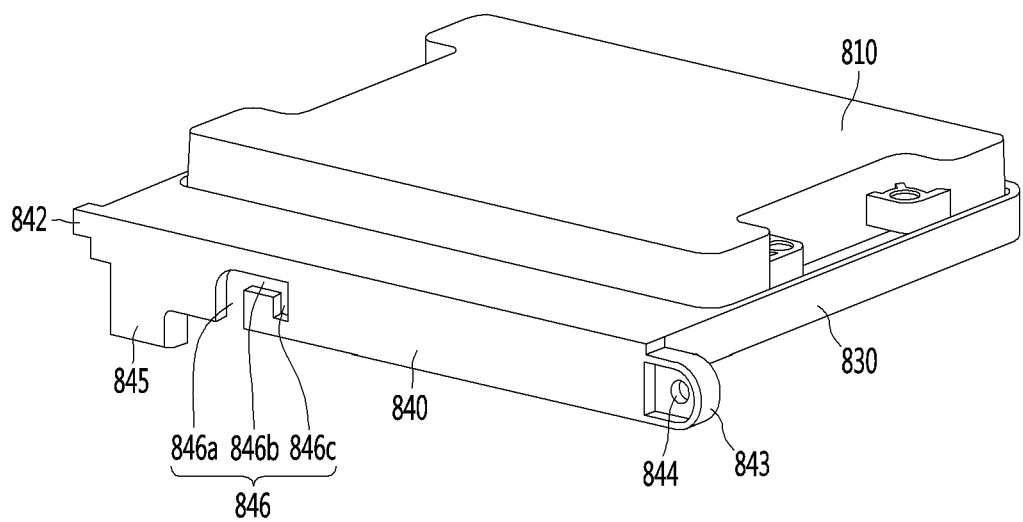
Figure 15:
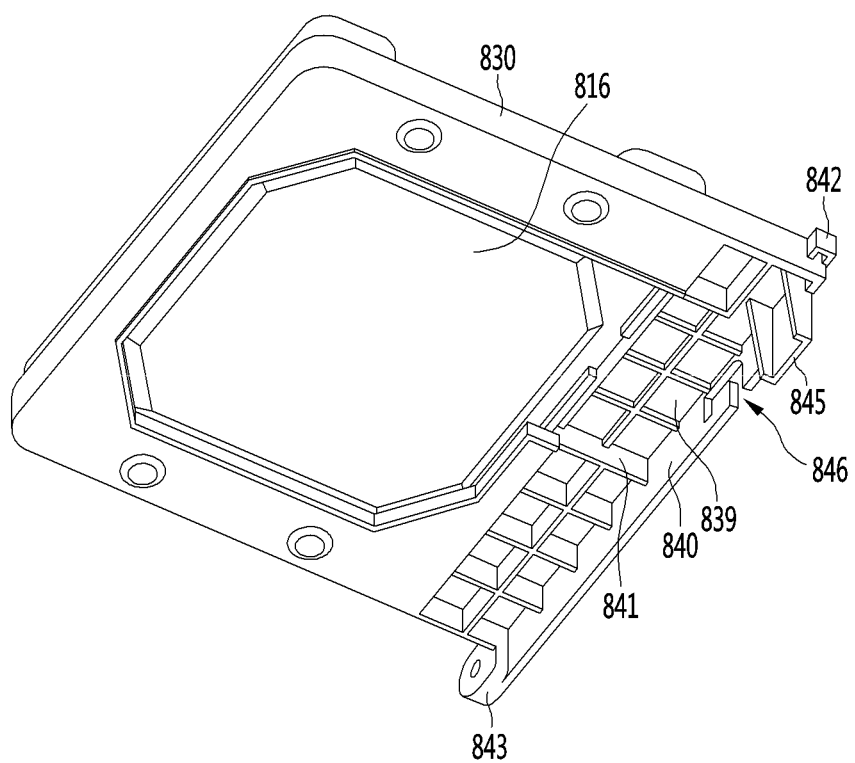
Figure 16:
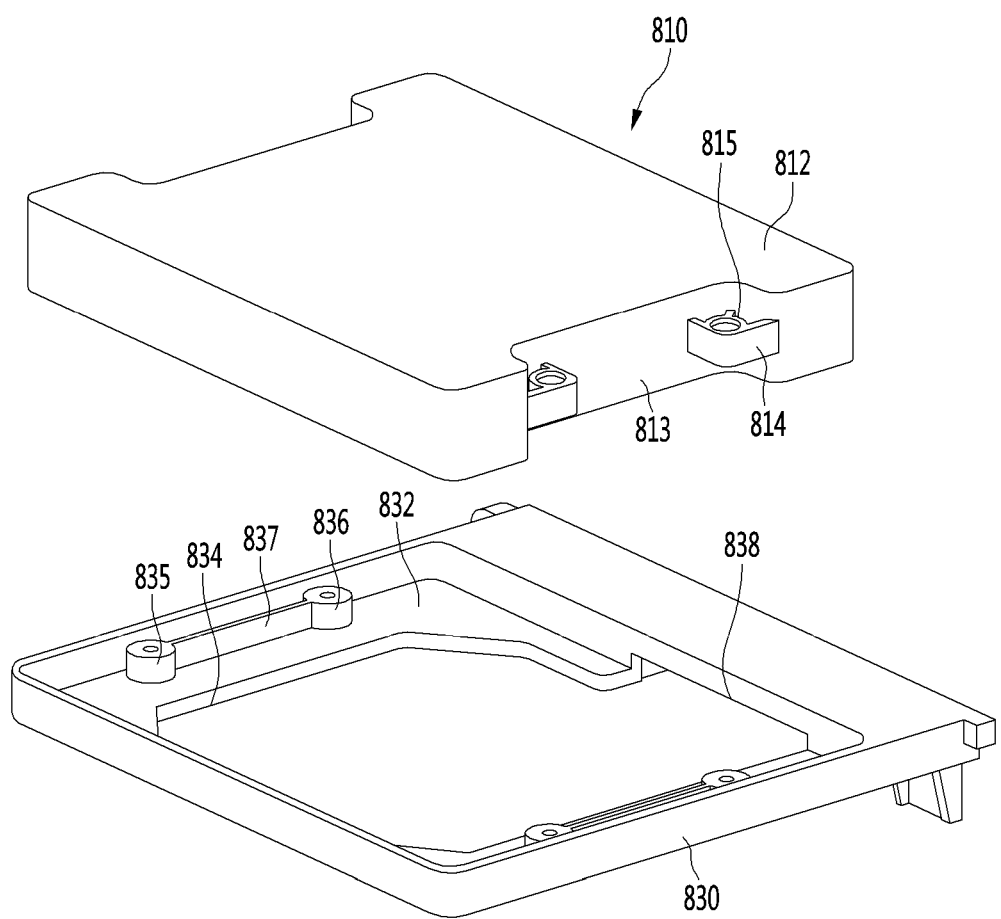
FIG. 16 is an exploded perspective view of the wireless charging module according to one embodiment of the present disclosure.

FIGS. 13 to 15 are perspective views of the wireless charging module according to one embodiment of the present disclosure. FIG. 16 is an exploded perspective view of the wireless charging module according to one embodiment of the present disclosure.

Referring to FIGS. 13 to 16, the wireless charging module 80 may include a charging unit 810 having the coil part and a frame 830 supporting the charging unit 810.

The charging unit 810 may include a housing 812, which protects the coil part. The housing 812 may be formed in a substantially rectangular parallelepiped shape.

The housing 812 may be provided with a laterally inwardly recessed portion 813. In one example, both laterally recessed portions 813 may be recessed to approach each other in an inward direction from the two facing sides of the housing 812.

The laterally recessed portion 813 may be provided with the frame-engagement portion 814 for engagement of the frame 830. When the frame-engagement portion 814 is formed on the laterally recessed portion 813, the frame-engagement portion 814 may not protrude outwardly of the frame 830 such that the size of the housing 812 may be prevented from increasing.

A plurality of the frame-engagement portions 814 may be arranged to be spaced from each other in a horizontal direction. The present disclosure is not limited to the above-described configuration. In the frame-engagement portion 814, an engagement hole 815 may be formed.

The vertical length of the frame-engagement portion 814 may be shorter than the vertical length of the housing 812. In one example, the frame-engagement portion 814 may be spaced apart from a top surface and a bottom surface of the housing 812.

On the bottom of the housing 812, a bottom protrusion 816 may be formed. The bottom protrusion 816 may be formed by a bottom portion of the housing 812 protruding downward. Thus, the bottom of the housing 812 is stepped at the bottom protrusion 816. The bottom of the bottom protrusion 816 is the lowest point of the housing 812.

The frame 830 may include the receiving groove 832 to accommodate the charging unit 810 therein. In one example, the receiving groove 832 may be formed by recessing a top surface portion of the frame 830 downward.

In the bottom of the receiving groove 832, a slot 834 may be formed for receiving the bottom protrusion 816 of the charging unit 810.

Thus, when the charging unit 810 is received within the receiving groove 832, a portion of the bottom of the housing 812 may be seated within the receiving groove 832, and the bottom protrusion 816 may be inserted into the slot 834.

On the bottom of the receiving groove 832, housing-engaging portions 835 and 836 for coupling with the housing 812 may be provided. The plurality of housing-engagement portions 835 and 836 may protrude upward from the bottom of the receiving groove 832. The present disclosure is not limited to the above-described configuration. In order that the plurality of housing-engagement portions 835 and 836 are prevented from being damaged during engagement thereof, the plurality of housing-engagement portions 835 and 836 may be connected to each other by a connection rib 837.

The connection rib 837 may be integrally formed with the bottom of the receiving groove 832 and the plurality of housing-engagement portions 835 and 836.

Thus, when the housing 812 is seated in the receiving groove 832, each of the housing-engagement portions 835 and 836 is positioned within the laterally recessed portion 813, and each frame-engagement portion 814 is seated on a top surface of each of the housing-engagement portions 835 and 836. Further, in this state, the fastener may be engaged sequentially with the frame-engagement portion 814 and the housing-engagement portions 835 and 836.

An electrical wire connected to the coil part of the charging unit 810 may extend to the outside. The frame 830 may include a guide 838 for guiding the electrical wire. In one example, the guide 838 may be formed as a recessed groove in the bottom of the frame 830.

In the bottom of the frame 830, an upwardly recessed groove 839 is formed. On the groove 839, a rib 841 may be formed for strength reinforcement. In one example, the rib may be formed in a grid shape, but the shape is not limited thereto.

The groove 839 may be arranged to communicate with the guide 838.

The frame 830 may further include a handle 840 for user grasping. The handle 840 may extend downward from a top surface edge of the frame 830. While the wireless charging module 80 is mounted on the module mounting casing 910, the handle 840 may cover a portion of the rear opening 927.

In the handle 840, a slit 846 may be formed through which an electrical wire connected to the coil part passes. The slit 846 may extend in a plurality of turns.

In one example, the slit 846 may include a first slit 846a extending in the first direction (in one example, vertical direction), a second slit 846b extending from one end of the first slit 846a to the second direction (in one example, horizontal direction), which intersects the first direction, and a third slit 846c extending from one end of the second slit 846b in the first direction.

The slit 846 may be formed in the approximate inversed U shape. The present disclosure is not limited to the above-described configuration.

In one example, the bottom of the first slit 846a is opened. From the top of the first slit 846a, the second slit 846b extends in the horizontal direction. The third slit 846c may extend downwardly from the end of the second slit 846b. In this connection, the length of the third slit 846c may be smaller than the length of the first slit 846a.

Therefore, after inserting the electrical wire first into the first slit 846a, then the electrical wire may move toward the third slit 846c via the second slit 846b. Thus, the electrical wire may be prevented from being easily removed from the slit 846.

On the handle 840, the engagement portion 843 may be formed. The engagement portion 843 may extend in the lateral direction from the handle 840. Alternatively, the engagement portion 843 may not extend from the handle 840, but the portion 843 may extend from the side face of the frame 830. An engagement hole 844 may be formed in the engagement portion 843.

On the frame 830, and on the opposite side of the engagement portion 843, the positioning protrusion 842 may be formed.

Further, the handle 840 may have an extended rib 845 extending downward from a lower end of the handle 840.

The extended rib 845 may allow reducing the gap between a lower end of the wireless charging module 80 and the bottom wall 911 of the module mounting casing 910 in a state in which the wireless charging module 80 is mounted on the module mounting casing 910.

When an external force is applied to the wireless charging module 80 from above the wireless charging module 80, the wireless charging module 80 is bent downward locally. At this time, the extended rib 845 is brought into contact with the bottom wall 911, so that the downward bend of the wireless charging module 80 may be prevented by the extended rib 845.

In one embodiment, in order to prevent the extended rib 845 from interfering with the module mounting casing 910 during the coupling process of the wireless charging module 80, the vertical length of the portion of the wireless charging module 80 where the extended rib 845 is formed may be smaller than the vertical length of the rear opening 927 of the module mounting casing 910.

Thus, in a state in which the wireless charging module 80 is mounted on the module mounting casing 910, the extended rib 845 may be spaced apart from the bottom wall 911 of the module mounting casing 910.

Figure 17:
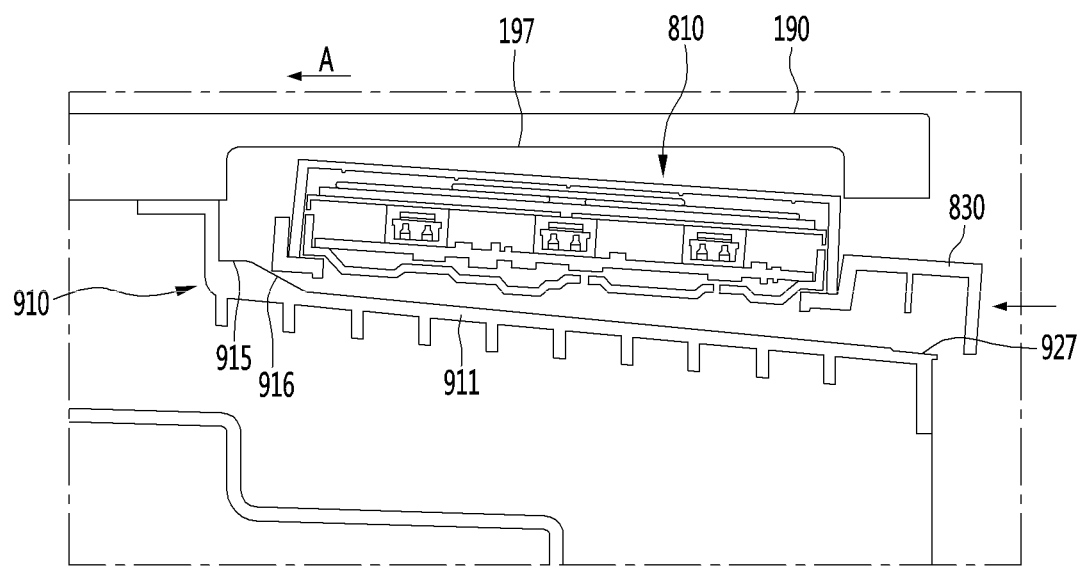
FIG. 17 illustrates a process of the wireless charging module being inserted into the module mounting casing according to one embodiment of the present disclosure.
Figure 18:
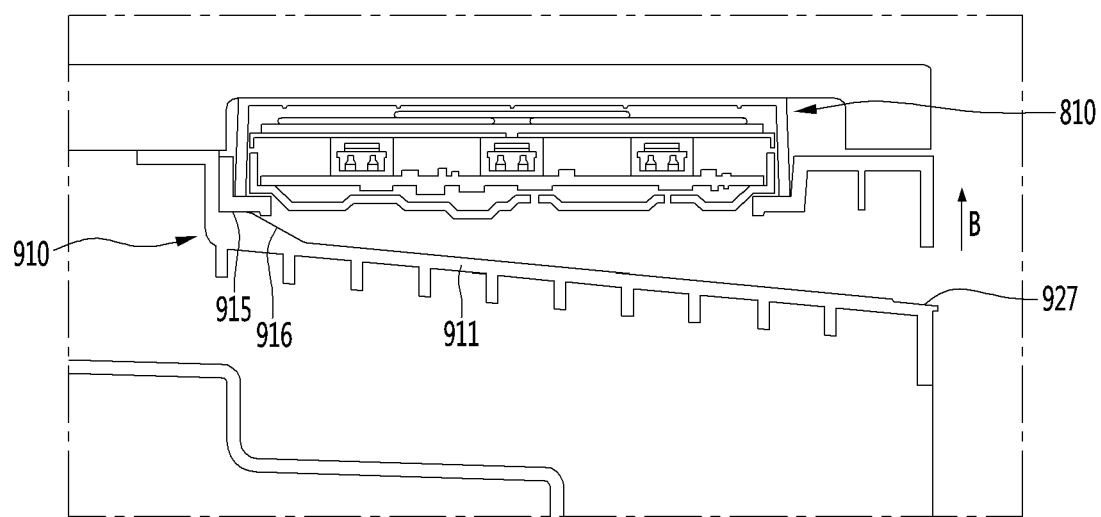
FIG. 18 shows a state in which the wireless charging module according to one embodiment of the present disclosure has been installed in the module mounting casing.

FIG. 17 is a view illustrating a process of inserting the wireless charging module into the module mounting casing, according to one embodiment of the present disclosure. FIG. 18 is a view showing a state in which the wireless charging module has been mounted on the module mounting casing, according to one embodiment of the present disclosure.

Referring to FIG. 9, FIG. 10, FIG. 16, and FIG. 18, the charging efficiency decreases as the distance between the mobile device and the wireless charging module increases while the mobile device is placed on a top surface of the cabinet cover 190.

Therefore, in order to improve the charging efficiency, it is necessary to reduce the interval between the mobile device and the wireless charging module 80.

In the present embodiment, in order to allow the distance between the mobile device and the wireless charging module 80 to be reduced, a module-receiving recess 197 having a recessed shape for receiving the wireless charging module 80 may be formed in the bottom surface of the cabinet cover 190. The module-receiving recess 197 may be formed by recessing the lower surface portion of the cabinet cover 190 upward.

Thus, the gap between the mobile device and the wireless charging module 80 may be reduced in proportional with the recess depth of the module-receiving recess 197.

The wireless charging module 80 may also be inserted in the module mounting casing from the rear of the module mounting casing 910 in a sliding manner (arrow A direction). In this connection, in order that the entire top surface of the wireless charging module 80 may be accommodated within the module-receiving recess 197, the front-rear length of the module-receiving recess 197 may be longer than the front-rear length of a top surface of the wireless charging module 80.

During the wireless charging module 80 is inserted into the module mounting casing 910 through the rear opening 927 of the module mounting casing 910, and the wireless charging module 80 is inserted into the module mounting casing 910, the wireless charging module 80 contacts the top inclined surface 916 of the support protrusion 915.

Thus, when the wireless charging module 80 contacts the top inclined surface 916, the wireless charging module 80 rises along the top inclined surface 916 and finally, the wireless charging module 80 is seated on a top surface of the support protrusion 915. Once the wireless charging module 80 is seated on the support protrusion 915, an upper portion of the wireless charging module 80 may be received within the module-receiving recess 197 of the cabinet cover 190. That is, due to the presence of the top inclined face 916, the wireless charging module 80 rises, so that a front end of the wireless charging module 80 may be accommodated in the module-receiving recess 197.

Then, as shown in FIG. 18, the assembler lifts the wireless charging module 80 in the direction of arrow B, and the assembler then places the positioning protrusion 842 of the wireless charging module 80 in the protrusion receiving groove 920. In this way, the engagement portion 843 may be received in the receiving groove 921. Further, finally, the fastener may be engaged with the engagement portion 843.

With the wireless charging module 80 being engaged on or in the module mounting casing 910, the wireless charging module 80 may be spaced from the bottom wall 911. Thus, the space between the wireless charging module 80 and the bottom wall 911 serves as a gap for heat dissipation.

The heat generated from the charging unit 810 may be cooled by air in the space between the wireless charging module 80 and the bottom wall 911.

According to the present embodiment, the wireless charging module is placed under the cabinet cover. Thus, there is an advantage that the battery of the mobile device can be wirelessly charged without changing the appearance of the refrigerator.

In addition, according to the present embodiment, the thermal-insulating material may be positioned between the module mounting casing 910 and the inner casing 110. The thermal-insulating material may contact the module mounting casing 910.

In this connection, the module mounting casing 910 for mounting the wireless charging module 80 thereon or therein is located on the rear surface of the refrigerator 1. Thus, the area of the module mounting casing 910 that does not overlap with the inner casing 110 in the vertical direction is maximized. Thus, the volume of thermal-insulating material which may be reduced by the module mounting casing 910 may be minimized. Thus, thermal-insulating performance degradation may be minimized.

Furthermore, according to the present disclosure, the charging port is provided in the display unit. Thus, even when the mobile device does not have wireless charging capability, the user has the advantage of charging the mobile device's battery by connecting the charging cable to the mobile device and connecting the charging cable to the charging port.

What is claimed is:

1. A refrigerator comprising:
   an inner casing having a storage chamber defined therein;
   a middle plate configured to surround an outer surface of the inner casing;
   a thermal-insulating material disposed between the inner casing and the middle plate;
   a module mounting casing fixed to the middle plate and having a top opening and an inserting opening;
   a cabinet cover that is configured to cover the top opening of the module mounting casing and that is configured to define a top appearance of the refrigerator; and
   a wireless charging module configured to be mounted on the module mounting casing through the inserting opening, wherein the wireless charging module comprises a coil part configured to wirelessly-charge a battery of a mobile device that is placed on the cabinet cover.

2. The refrigerator of claim 1, wherein the cabinet cover comprises a module-receiving recess defined therein that is configured to receive a portion of the wireless charging module.

3. The refrigerator of claim 2, wherein a length of the module-receiving recess is greater than a length of the wireless charging module.

4. The refrigerator of claim 2, wherein the cabinet cover is composed of a wooden material.

5. The refrigerator of claim 2, wherein the module mounting casing comprises a horizontal extension that extends in a horizontal direction from a top edge of the module mounting casing,
   wherein the horizontal extension is configured to contact a bottom surface of the cabinet cover.

6. The refrigerator of claim 1, wherein the module mounting casing comprises (i) a bottom wall, (ii) two side walls extending upward from opposing sides of the bottom wall, and (iii) a front wall extending upward from a front end of the bottom wall,
   wherein the inserting opening is positioned opposite the front wall.

7. The refrigerator of claim 6, wherein the bottom wall of the module mounting casing slopes upward from the inserting opening towards the front wall of the module mounting casing.

8. The refrigerator of claim 7, wherein the module mounting casing further comprises a support protrusion that is disposed on the bottom wall of the module mounting casing, and
   wherein the support protrusion has a top inclined surface configured to elevate the wireless charging module in a state in which the wireless charging module is inserted into the module mounting casing.

9. The refrigerator of claim 8, wherein the support protrusion is integrally formed with the bottom wall and the front wall of the module mounting casing.

10. The refrigerator of claim 1, wherein the wireless charging module further comprises:
    a charging unit comprising the coil part; and
    a frame configured to support the charging unit,
    wherein the frame is configured to be fixed to the module mounting casing in a state in which the charging unit is supported on the frame.

11. The refrigerator of claim 10, wherein the charging unit of the wireless charging module comprises a housing that is configured to receive the coil part therein,
    wherein the housing of the charging unit has a laterally recessed portion that is recessed inwards into the housing,
    wherein the housing of the charging unit of the wireless charging module comprises a plurality of frame-engagement portions that are disposed on the laterally recessed portion and that are spaced apart from each other, wherein the frame of the wireless charging module comprises a plurality of housing-engagement portions that are configured to engage with the plurality of frame-engagement portions of the charging unit in a state in which the charging unit is supported on the frame.

12. The refrigerator of claim 11, wherein a vertical length of each of the plurality of frame-engagement portions of the housing of the charging unit of the wireless charging module is smaller than a vertical length of the housing, wherein each of the plurality of frame-engagement portions is spaced apart from a top surface and a bottom surface of the housing of the charging unit of the wireless charging module.

13. The refrigerator of claim 11, wherein the frame of the wireless charging module has a receiving groove, wherein the plurality of housing-engagement portions of the frame of the wireless charging module protrude upward from the receiving groove of the frame, and wherein, in the state in which the charging unit is supported on the frame and the housing of the charging unit of the wireless charging module is accommodated in the receiving groove of the frame:

the plurality of housing-engagement portions of the frame are positioned in the laterally recessed portion of the housing of the charging unit.

14. The refrigerator of claim 13, wherein the frame of the wireless charging unit further comprises a connection rib that protrudes upwardly from a bottom surface of the receiving groove of the frame, and wherein the connection rib interconnects the plurality of housing-engagement portions of the frame to one another.

15. The refrigerator of claim 13, wherein the housing of the charging unit of the wireless charging module has a bottom protrusion that protrudes downward, and wherein the receiving groove of the frame of the wireless charging module defines a slot that is configured to receive the bottom protrusion of the housing of the charging unit in the state in which the charging unit is supported on the frame.

16. The refrigerator of claim 10, wherein the frame of the wireless charging module further comprises a handle extending downward from one side of a top surface of the frame, and wherein the handle of the frame is configured to cover a portion of the inserting opening of the module mounting casing.

17. The refrigerator of claim 16, wherein the handle of the frame of the wireless charging module has a slit that is defined therein through which a wire connected to the coil part of the charging unit is configured to pass.

18. The refrigerator of claim 16, wherein the handle of the frame of the wireless charging module has an extended rib that extends downward from a lower end of the handle and that is spaced apart from a bottom wall of the module mounting casing.

19. The refrigerator of claim 10, wherein the frame of the wireless charging module comprises (i) a positioning protrusion that is configured to position the module mounting casing, and (ii) an engagement portion that is configured to secure the module mounting casing, and wherein the module mounting casing comprises (i) a protrusion-receiving groove that is configured to receive the positioning protrusion of the frame therein, and (ii) a receiving groove that is configured to receive the engagement portion of the frame therein.

20. The refrigerator of claim 19, wherein the engagement portion of the frame of the wireless charging module is positioned opposite the positioning protrusion of the frame.

* * * * *